(12) United States Patent
Suginobu

(10) Patent No.: US 10,199,065 B2
(45) Date of Patent: Feb. 5, 2019

(54) FLUID BEARING APPARATUS, MOTOR, AND DISK DRIVE APPARATUS

(71) Applicant: Nidec Corporation, Kyoto (JP)

(72) Inventor: Shingo Suginobu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/917,891

(22) Filed: Mar. 12, 2018

(65) Prior Publication Data

US 2018/0315449 A1 Nov. 1, 2018

(30) Foreign Application Priority Data

Apr. 27, 2017 (JP) ................................. 2017-087868

(51) Int. Cl.
*G11B 19/20* (2006.01)
*F16C 33/10* (2006.01)
*F16C 17/10* (2006.01)

(52) U.S. Cl.
CPC ........ *G11B 19/2036* (2013.01); *F16C 17/107* (2013.01); *F16C 33/107* (2013.01); *F16C 2380/26* (2013.01)

(58) Field of Classification Search
CPC .................................................. G11B 19/2036
USPC ............................... 360/99.05, 99.06, 99.08
See application file for complete search history.

(56) References Cited

U.S. PATENT DOCUMENTS

| 5,707,154 | A | * | 1/1998 | Ichiyama | ............... F16C 17/107 384/107 |
| 9,030,068 | B2 | | 5/2015 | Park | |
| 2004/0070298 | A1 | * | 4/2004 | Aiello | ................... F16C 17/107 310/90 |
| 2012/0033328 | A1 | * | 2/2012 | Mizukami | ............... H02K 7/085 360/99.08 |
| 2012/0063030 | A1 | * | 3/2012 | Yamada | ................. F16C 17/107 360/99.08 |
| 2013/0243356 | A1 | * | 9/2013 | Yamada | ............... F16C 32/0659 384/123 |
| 2014/0078879 | A1 | * | 3/2014 | Sekii | ..................... F16C 33/745 369/270.1 |
| 2015/0055246 | A1 | * | 2/2015 | Sumiji | ............... G11B 19/2009 360/99.08 |

* cited by examiner

*Primary Examiner* — Allen T Cao
(74) *Attorney, Agent, or Firm* — Keating & Bennett, LLP

(57) ABSTRACT

A fluid bearing apparatus according to a preferred embodiment of the present invention includes a shaft arranged to extend along a central axis extending in a vertical direction; a rotating portion arranged opposite to an outer circumferential surface of the shaft, and arranged to be capable of rotating about the central axis with respect to the shaft; a lubricating oil arranged in a gap between the rotating portion and each of upper and lower outer circumferential surfaces of the shaft; a first groove defined in at least one of a middle outer circumferential surface of the shaft and a portion of an inner circumferential surface of the rotating portion, the portion being opposite to the middle outer circumferential surface, the first groove being arranged to extend along a circumferential direction; a plurality of second grooves each of which is defined in an upper surface of the rotating portion; and a plurality of communicating holes each of which is defined in the rotating portion, and is in communication with the first groove and a corresponding one of the second grooves.

10 Claims, 9 Drawing Sheets

__US 10,199,065 B2__

FLUID BEARING APPARATUS, MOTOR, AND DISK DRIVE APPARATUS

CROSS REFERENCE TO RELATED APPLICATIONS

This application claims the benefit of priority to Japanese Patent Application No. 2017-087868 filed on Apr. 27, 2017. The entire contents of this application are hereby incorporated herein by reference.

BACKGROUND OF THE INVENTION

1. Field of the Invention

The present invention relates to a fluid bearing apparatus, a motor, and a disk drive apparatus.

2. Description of the Related Art

A disk drive apparatus, such as, for example, a hard disk drive, has been known. A spindle motor arranged to rotate a disk is typically installed in the disk drive apparatus. A known spindle motor is described in, for example, U.S. Pat. No. 9,030,068. The spindle motor described in U.S. Pat. No. 9,030,068 includes a shaft connected to a base member, and a sleeve arranged to rotate with respect to the shaft. A lubricating fluid is arranged in a gap between the shaft and the sleeve. An outer circumferential surface of the shaft includes a groove to form a gas-liquid interface. The sleeve includes a communicating hole to bring the groove into communication with an external space to make it easier to inject the lubricating fluid into the groove.

A sleeve generally has a small radial thickness. Therefore, when the sleeve has a communicating hole as the sleeve described in U.S. Pat. No. 9,030,068 does, the sleeve may fail to have sufficient rigidity. This in turn may lead to insufficient rigidity of a spindle motor.

SUMMARY OF THE INVENTION

A fluid bearing apparatus according to a preferred embodiment of the present invention includes a shaft arranged to extend along a central axis extending in a vertical direction, the shaft having an outer circumferential surface including a middle outer circumferential surface, an upper outer circumferential surface arranged axially above the middle outer circumferential surface, and a lower outer circumferential surface arranged axially below the middle outer circumferential surface; a rotating portion arranged opposite to an outer circumferential surface of the shaft, and arranged to be capable of rotating about the central axis with respect to the shaft; a lubricating oil arranged in a gap between the rotating portion and each of the upper and lower outer circumferential surfaces of the shaft; a first groove defined in at least one of the middle outer circumferential surface of the shaft and a portion of an inner circumferential surface of the rotating portion, the portion being opposite to the middle outer circumferential surface, the first groove being arranged to extend along a circumferential direction; a plurality of second grooves each of which is defined in an upper surface of the rotating portion; and a plurality of communicating holes each of which is defined in the rotating portion, and is in communication with the first groove and a corresponding one of the second grooves.

According to the above preferred embodiment of the present invention, air circulation channels to stabilize surfaces of the lubricating oil are defined in the rotating portion, which is rigid, and this leads to easier working, and increased rigidity of the fluid bearing apparatus.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. In the present application, spindle motors according to preferred embodiment of the present invention will be described as examples of motors including a fluid bearing apparatus. It is assumed herein that a direction parallel to a central axis of a motor is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a stator portion is arranged with respect to a base portion is defined as an upper side. The shape of each member or portion and relative positions of different members or portions will be described based on the above assumptions. It should be noted, however, that the above definitions of the vertical direction and the upper and lower sides are not meant to restrict in any way the orientation of a motor or a disk drive apparatus according to any preferred embodiment of the present invention when in use.

Also note that the term "parallel" as used herein includes both "parallel" and "substantially parallel". Also note that the term "perpendicular" as used herein includes both "perpendicular" and "substantially perpendicular".

Figure 1:
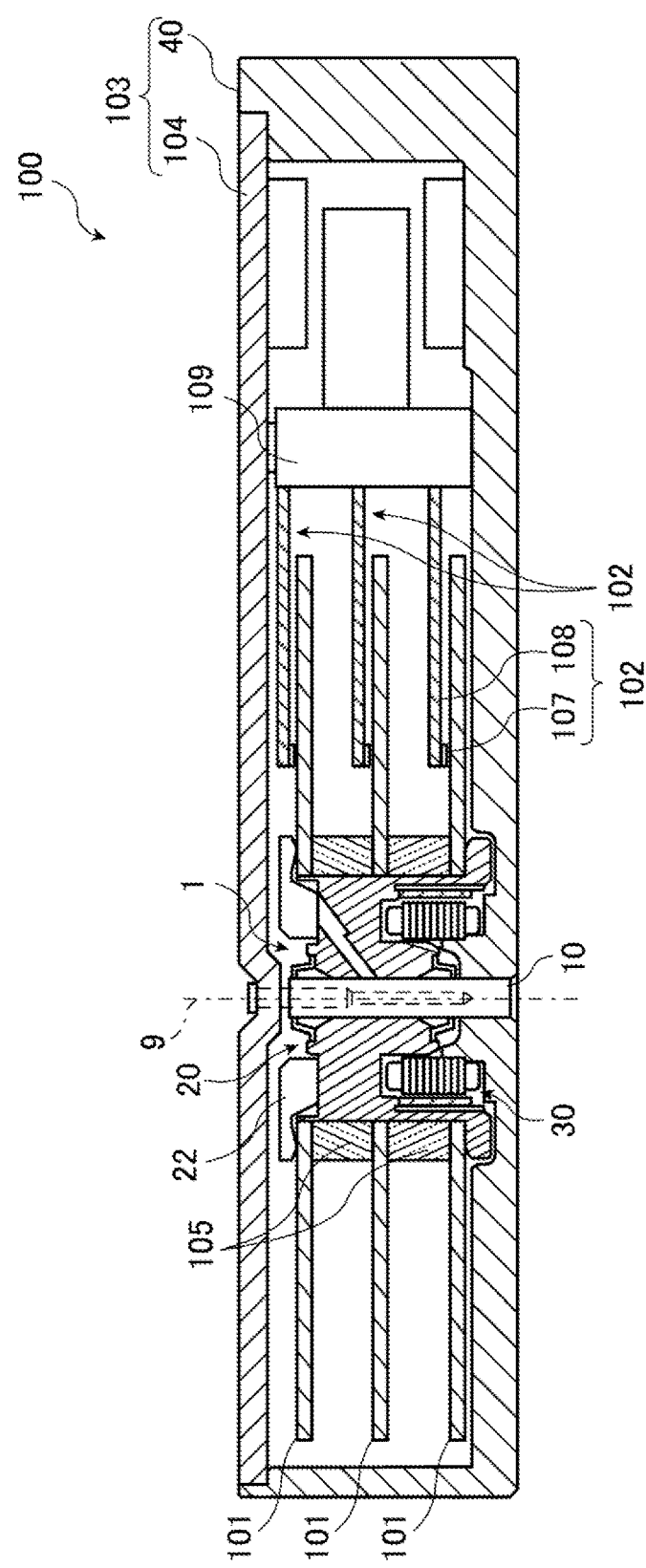
FIG. 1 is a sectional view of a disk drive apparatus according to a first preferred embodiment of the present invention.

FIG. 1 is a sectional view of a disk drive apparatus 100 according to a first preferred embodiment of the present invention.

The disk drive apparatus 100 is a hard disk drive arranged to rotate three magnetic disks 101 and perform reading and writing of information from or to the magnetic disks 101 while rotating the magnetic disks 101. The disk drive apparatus 100 includes a spindle motor 1, the three magnetic disks 101, three access portions 102, and a housing 103 arranged to house the spindle motor 1, the magnetic disks 101, and the access portions 102.

The housing 103 includes a base portion 40 and a cover member 104. The base portion 40 defines a portion of the spindle motor 1, which will be described below. The base portion 40 is an aluminum die-casting, and is molded by, for example, casting. The base portion 40 has an opening. The cover member 104 is fitted to the opening of the base portion 40. The housing 103 is defined as a result. A shaft 10, a rotating portion 20, and a stator portion of the spindle motor 1, which will be described below, are housed in an interior space of the housing 103. The base portion and the cover member 104 are combined so as to maintain airtightness of the interior space of the housing 103.

The interior space of the housing 103 is filled with a gas having a density lower than that of air, such as, for example, helium, hydrogen, a gas mixture of helium and hydrogen, or a gas mixture of any one of the above and air. Each of the above gases has a density lower than that of air outside of the housing 103. Accordingly, viscous drag which is applied to each of the magnetic disks 101 and the access portions 102 is low. This leads to a reduction in a windage loss of each of the magnetic disks 101 and the access portions 102 while the disk drive apparatus 100 is in operation, and to reductions in wind noise and the like while the magnetic disks 101 are rotating.

Each of the magnetic disks 101 is a medium on which information is recorded. The magnetic disks 101 are placed one above another along a central axis 9 extending in the vertical direction with a spacer 105 arranged between every adjacent ones of the magnetic disks 101. In addition, each of the magnetic disks 101 is supported by the spindle motor 1, which will be described in detail below. The magnetic disks 101 are caused by the spindle motor 1 to rotate about the central axis 9.

Each access portion 102 includes a head 107 and an arm 108. The head 107 is arranged in close proximity to a surface of a corresponding one of the magnetic disks 101 to magnetically perform at least one of reading of information recorded on the corresponding magnetic disk 101 and writing of information to the corresponding magnetic disk 101. The head 107 is supported by the arm 108. The arm 108 is supported by a head actuator mechanism 109. That is, each access portion 102 is supported by the head actuator mechanism 109.

Figure 2:
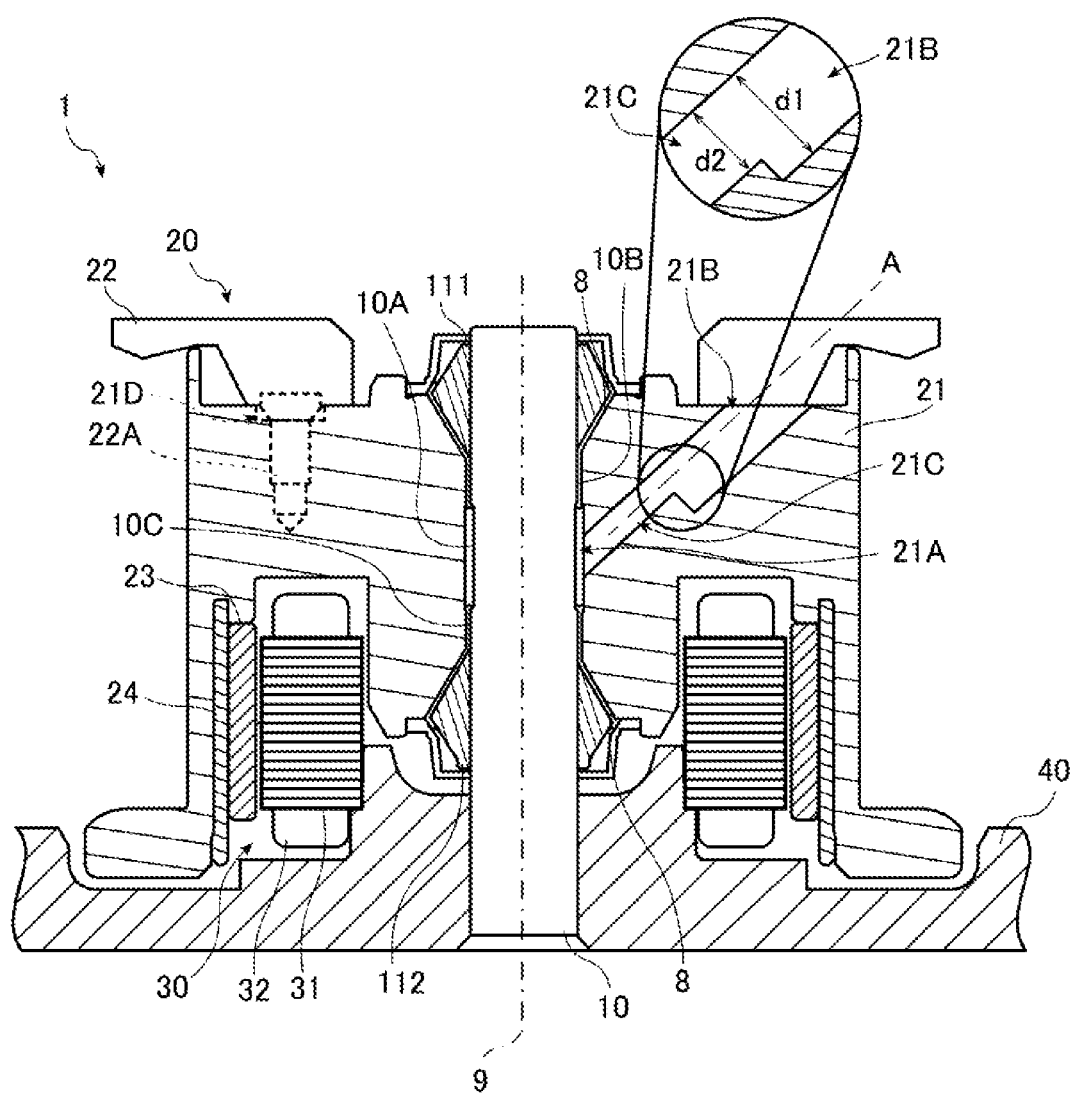
FIG. 2 is an enlarged view of a spindle motor of the disk drive apparatus illustrated in FIG. 1.

FIG. 2 is an enlarged view of the spindle motor 1 of the disk drive apparatus 100 illustrated in FIG. 1.

The spindle motor 1 includes the shaft 10, annular members 111 and 112, the rotating portion 20, the stator portion 30, and the base portion 40. The spindle motor 1 according to the present preferred embodiment is a three-phase motor. Each of spindle motors according to exemplary preferred embodiments of the present invention described below is also a three-phase motor.

The shaft 10 is a substantially columnar member arranged to extend along the central axis 9. The shaft 10 is arranged to support the rotating portion 20 such that the rotating portion 20 is capable of rotating about the central axis 9. The shaft 10 is made of, for example, a metal such as stainless steel or the like. An upper end portion of the shaft 10 is fixed to the cover member 104 of the housing 103 illustrated in FIG. 1. A lower end portion of the shaft 10 is fixed to the base portion 40.

The annular members 111 and 112 are arranged on an outer circumferential surface of the shaft 10. The annular member 111 is arranged on an upper portion of the shaft 10, while the annular member 112 is arranged on a lower portion of the shaft 10, and is axially spaced from the annular member 111. Each of the annular members 111 and 112 is arranged to project radially outward from the outer circumferential surface of the shaft 10. Each of the annular members 111 and 112 may be defined by a member separate from the shaft 10. Alternatively, the annular members 111 and 112 and the shaft 10 may be defined by a single monolithic member.

An axial middle portion of a portion of the outer circumferential surface of the shaft 10, the portion lying between the annular members 111 and 112, will be hereinafter referred to as a middle outer circumferential surface 10A. In addition, a portion of the outer circumferential surface of the shaft 10 which is axially above the middle outer circumferential surface 10A will be hereinafter referred to as an upper outer circumferential surface 10B. Further, a portion of the outer circumferential surface of the shaft 10 which is axially below the middle outer circumferential surface 10A will be hereinafter referred to as a lower outer circumferential surface 10C.

The rotating portion 20 is a rotating member arranged to rotate about the central axis 9 with respect to the shaft 10 and the annular members 111 and 112. The rotating portion 20 includes a rotor hub 21, a clamp member 22, a rotor magnet 23, and a yoke 24.

The rotor hub 21 is a cylindrical member capable of rotating about the central axis 9. An inner circumferential surface of the rotor hub 21 is arranged opposite to each of the outer circumferential surface of the shaft 10 and outer circumferential surfaces of the annular members 111 and 112 with a minute gap therebetween. A lubricating oil 8 is arranged in the minute gap. More specifically, the lubricating oil 8 is arranged in a minute gap between the inner circumferential surface of the rotor hub 21 and a combination of the outer circumferential surface of the annular member 111 and the upper outer circumferential surface 10B of the shaft 10. In addition, the lubricating oil 8 is also arranged in a minute gap between the inner circumferential surface of the rotor hub 21 and a combination of the outer circumferential surface of the annular member 112 and the lower outer circumferential surface 10C of the shaft 10.

Although not shown in the figures, one of the inner circumferential surface of the rotor hub 21 and the outer circumferential surface of each of the shaft 10 and the annular members 111 and 112, which together define the minute gap in which the lubricating oil 8 is arranged, includes a dynamic pressure groove arranged to generate a dynamic pressure in the lubricating oil 8.

At least one of the middle outer circumferential surface 10A of the shaft 10 and a portion of the inner circumferential surface of the rotor hub 21, the portion being opposite to the middle outer circumferential surface 10A, includes a first groove 21A arranged to extend along a circumferential direction. The first groove 21A is arranged to be in communication with an external space through a plurality of communicating holes 21C and a plurality of second grooves 21B defined in the rotor hub 21. The first groove 21A, the communicating holes 21C, and the second grooves 21B define air circulation channels to stabilize surfaces of the lubricating oil 8 arranged in the minute gaps. Each of the first groove 21A, the second grooves 21B, and the communicating holes 21C will be described in detail below.

The clamp member 22 is held on an upper surface of the rotor hub 21 through screws 22A. As illustrated in FIG. 1, the clamp member 22 is arranged to support the magnetic disks 101 between the clamp member 22 and the rotor hub 21. The magnetic disks 101 are thus arranged to rotate about the central axis 9 while being supported by the rotating portion 20.

The rotor magnet 23 is fixed to an inner circumferential surface of the rotor hub 21 with the yoke 24 therebetween. The rotor magnet 23 is in the shape of a circular ring, and is centered on the central axis 9. An inner circumferential surface of the rotor magnet 23 is a pole surface in which north and south poles alternate with each other in the circumferential direction.

The stator portion 30 is arranged radially inside of the rotor magnet 23. The stator portion 30 is arranged to produce a torque to rotate the rotating portion 20. The stator portion 30 includes a plurality of coils 31 and a stator core 32.

The stator core 32 is a laminated structure defined by axially laminated magnetic bodies each of which is in the shape of a circular ring and is centered on the central axis 9, and is fixed to the base portion 40. The stator core 32 includes a plurality of teeth arranged to project radially outward.

The coils 31 are wound around the teeth, and are arranged in an annular shape with the central axis 9 as a center. The coils 31 are made up of three coil groups. The three coil groups are a coil group for a U phase, a coil group for a V phase, and a coil group for a W phase. Each coil group is defined by one conducting wire. The coils 31 and the stator core 32 are arranged radially opposite to the rotor magnet 23. Once an electric drive current is supplied to the coils 31, radial magnetic flux is generated. The generated magnetic flux interacts with magnetic flux of the rotor magnet 23 to produce a torque to rotate the rotating portion 20 about the central axis 9.

In the spindle motor 1 having the above-described structure, a turning force is applied to the rotor hub 21 by the stator portion 30. In addition, the rotor hub 21 is directly coupled to the shaft 10. In related art, a rotor hub is typically coupled to a shaft with a separate sleeve member interposed therebetween. In this case, a disk is supported by the rotor hub and the sleeve member, i.e., two members, such that the disk is capable of rotating with respect to the shaft. In view of stress caused by a change in temperature, it is desirable that coefficients of linear expansion of the rotor hub, the sleeve member, and the disk approximate to each other. However, it is difficult to make coefficients of linear expansion of three members approximate to each other.

In the spindle motor 1 according to the present preferred embodiment, the rotor hub 21 is arranged to support the magnetic disks 101 without another member being interposed between the rotor hub 21 and the shaft 10. In this case, it is necessary only to make coefficients of linear expansion of the rotor hub 21 and the magnetic disks 101, i.e., two types of members, approximate to each other. When this is achieved, a change in temperature would not generate an excessive stress between the rotor hub 21 and each magnetic disk 101. A metal such as stainless steel or the like, for example, is used as a material of the rotor hub 21. A primary material of each magnetic disk 101 is glass.

Figure 3:
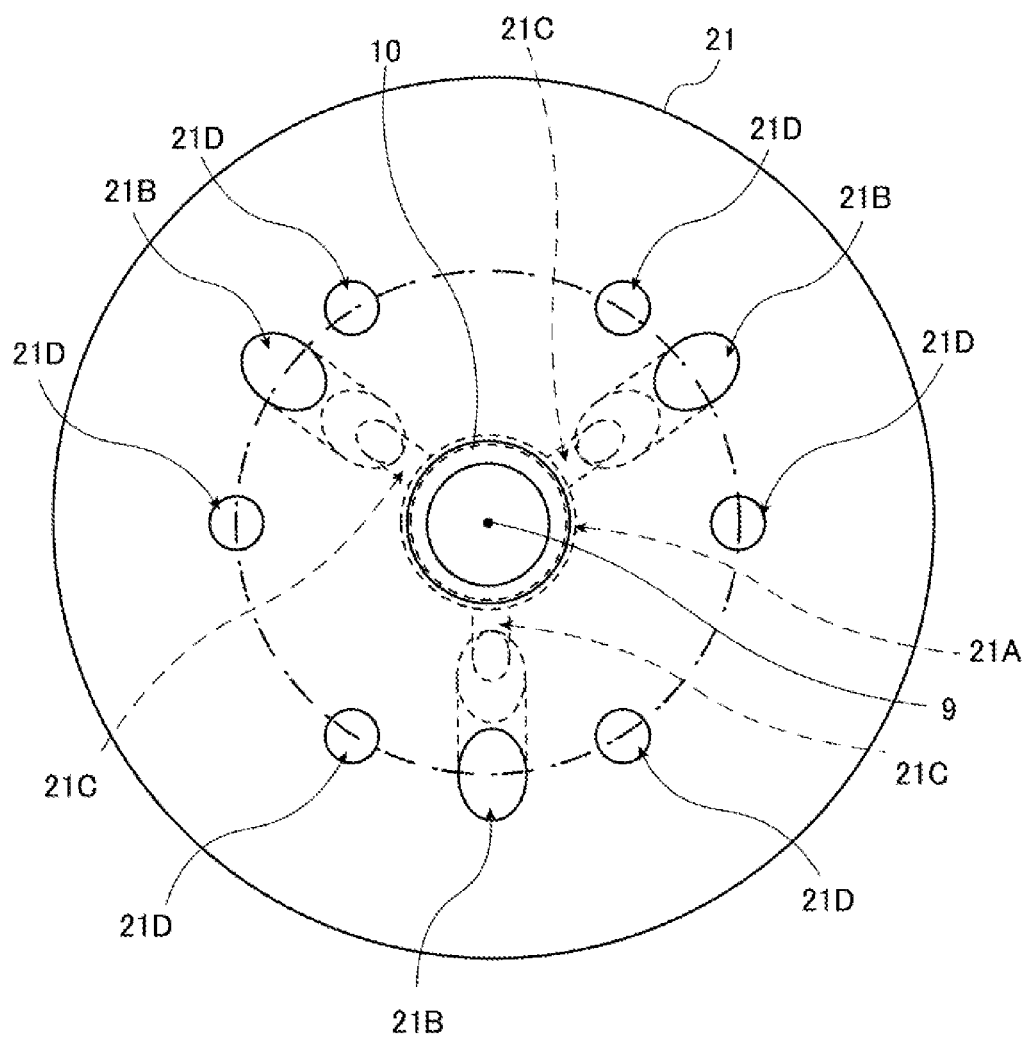
FIG. 3 is a plan view of a rotor hub according to the first preferred embodiment as viewed from an axially upper side.

FIG. 3 is a plan view of the rotor hub 21 as viewed from the axially upper side.

As noted above, the first groove 21A is defined in at least one of the outer circumferential surface of the shaft 10 and the inner circumferential surface of the rotor hub 21. The first groove 21A is arranged to extend along the circumferential direction.

In the upper surface of the rotor hub 21, the plurality (three in FIG. 3) of second grooves 21B are arranged along the circumferential direction. An opening of each second groove 21B is elliptical in a plan view when viewed from the axially upper side. Each second groove 21B is recessed in an oblique direction angled with respect to the axial direction from the opening in the upper surface of the rotor hub 21, while maintaining a constant opening width. Here, the oblique direction is, for example, a direction along dashed line A in FIG. 2. In addition, as illustrated in FIG. 2, the term "opening width" refers to a distance between points on a wall which are opposite to each other in a direction perpendicular to the direction in which the second groove 21B is recessed, and the opening width of the second groove 21B is denoted by d1.

In the upper surface of the rotor hub 21, a plurality of screw grooves 21D are arranged along the circumferential direction. The screws 22A are inserted into the screw grooves 21D to fix the clamp member 22. Each of the screw grooves 21D is recessed in the axial direction, and the screw grooves 21D are arranged along the circumferential direction. The second grooves 21B and the screw grooves 21D are arranged at different positions, without overlapping with one another, on the same circle centered on the central axis 9 and represented by a dot-dashed line in FIG. 3.

The plurality of communicating holes 21C, each of which is arranged to bring the first groove 21A into communication with a corresponding one of the second grooves 21B, are defined in the rotor hub 21. The first groove 21A is arranged to be in communication with the external space through the communicating holes 21C and the second grooves 21B. Each communicating hole 21C is arranged to extend in a straight line and pass through the rotor hub 21 in the same direction as the direction in which the corresponding second groove 21B is recessed. That is, each second groove 21B and a corresponding one of the communicating holes 21C are arranged on the same straight line extending in the corresponding oblique direction, e.g., the direction along dashed line A in FIG. 2. Each communicating hole 21C is arranged to extend in the corresponding oblique direction while maintaining a constant opening width. The opening width of the communicating hole 21C is denoted by d2 as illustrated in FIG. 2. In this case, the opening width d2 of the communicating hole 21C is smaller than the opening width d1 of the second groove 21B.

Figure 4:
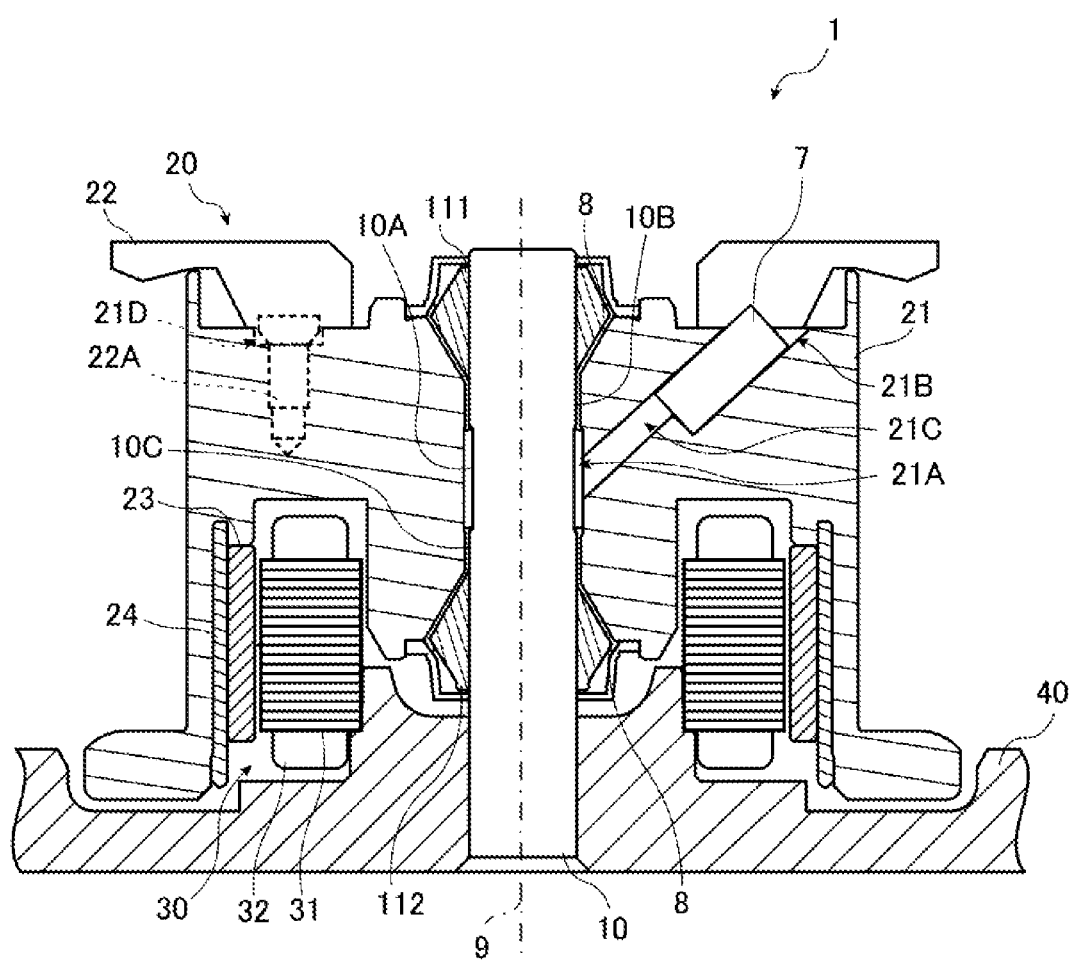
FIG. 4 is a diagram illustrating the spindle motor with a weight inserted in a second groove.

A weight 7 is inserted in at least one of the second grooves 21B. FIG. 4 is a diagram illustrating the spindle motor 1 with the weight 7 inserted in one of the second grooves 21B. The weight 7 is a member to adjust rotation balance of the rotating portion 20. The weight 7 is, for example, columnar, and is at least arranged to have a diameter smaller than the opening width d1 of the second groove 21B and greater than the opening width d2 of the communicating hole 21C. As described above, the inequality, d1>d2, holds, and therefore, the weight 7 inserted in the second groove 21B does not enter into the communicating hole 21C. That is, the difference between the opening width of the second groove 21B and the opening width of the communicating hole 21C makes it possible to position the weight 7. Note that it may be sufficient if the weight 7 has such a size that the weight 7 cannot enter into the communicating hole 21C, and that the weight 7 may alternatively be in the shape of a prism or a sphere.

As described above, the communicating holes 21C, the second grooves 21B, and optionally the first groove 21A, which define the air circulation channels to stabilize the surfaces of the lubricating oil 8, are defined in the rotor hub 21, which is made of, for example, stainless steel and which is rigid, and thus can be easily worked. This leads to increased rigidity of the spindle motor 1. In addition, each second groove 21B can be used also as a groove in which the weight 7 can be inserted to adjust the rotation balance of the rotor hub 21, and this leads to preventing an increase in the number of working steps.

Figure 5:
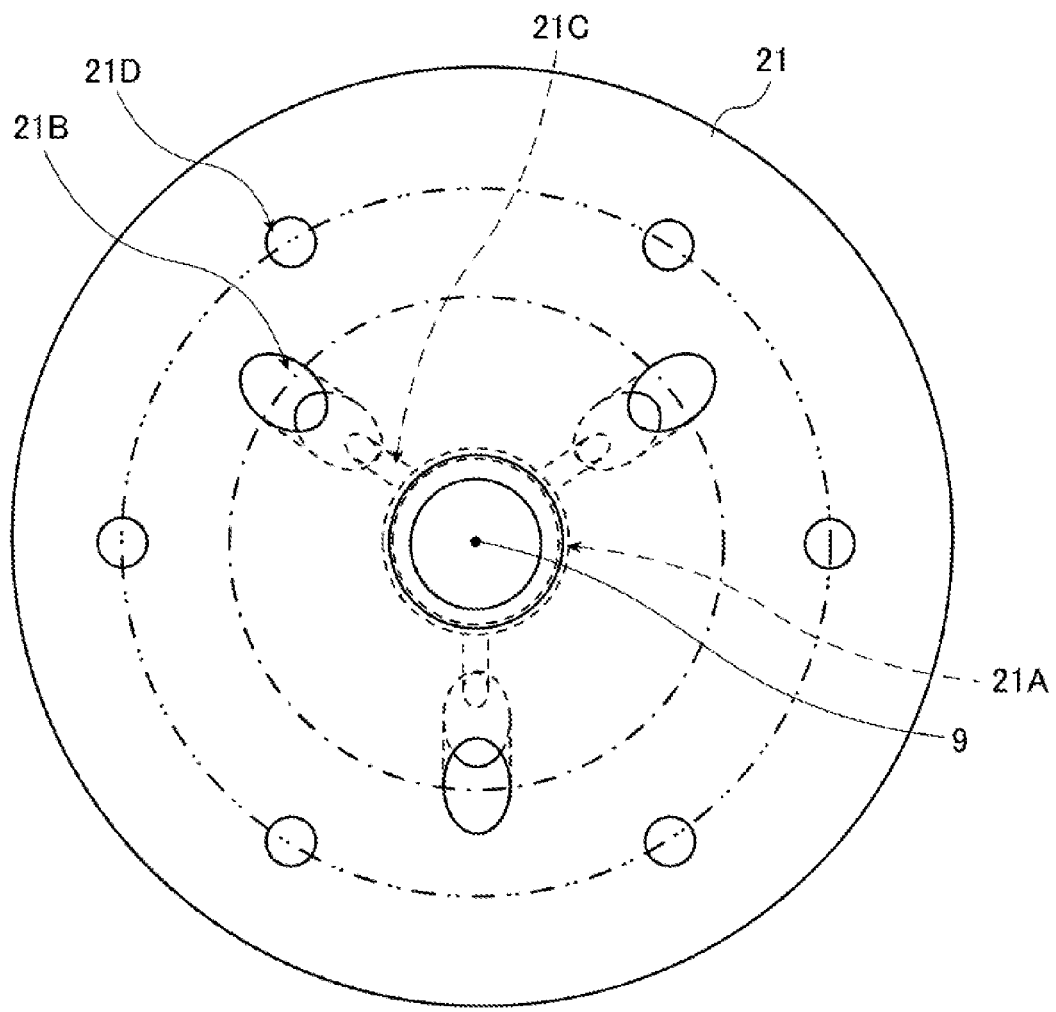
FIG. 5 is a plan view, as viewed from the axially upper side, of a rotor hub according to a modification of the first preferred embodiment in which second grooves and screw grooves are arranged on concentric circles having different diameters.

Note that, although the second grooves 21B and the screw grooves 21D are arranged on the same circle in the present preferred embodiment, the second grooves 21B and the screw grooves 21D may alternatively be arranged on concentric circles having different diameters. FIG. 5 is a plan view of a rotor hub 21 as viewed from the axially upper side according to a modification of the first preferred embodiment in which second grooves 21B and screw grooves 21D are arranged on concentric circles having different diameters. The second grooves 21B are arranged on a circle represented by a dot-dashed line in FIG. 5. Meanwhile, the screw grooves 21D are arranged on a circle represented by a two-dot chain line in FIG. 5. In this modification, the second grooves 21B are arranged on the radially inner side of the screw grooves 21D. In this case, the rotor hub 21 is more excellent in rigidity and durability with a greater distance between adjacent ones of the second grooves 21B and the screw grooves 21D than in the case where the second grooves 21B and the screw grooves 21D are arranged on the same circle. The screw grooves 21D according to this modification are examples of "second screw grooves" of the present application. Note that the second grooves 21B may alternatively be arranged on the radially outer side of the screw grooves 21D.

Next, a disk drive apparatus according to a second preferred embodiment of the present invention will now be described below. The second preferred embodiment is different from the first preferred embodiment in the structure of the spindle motor, in particular, in the structure of the second grooves. Differences therebetween will be described below. The structure of the disk drive apparatus according to the second preferred embodiment is similar to the structure of the disk drive apparatus 100 according to the first preferred embodiment except in the structure of the spindle motor, and accordingly, redundant description is omitted.

Figure 6:
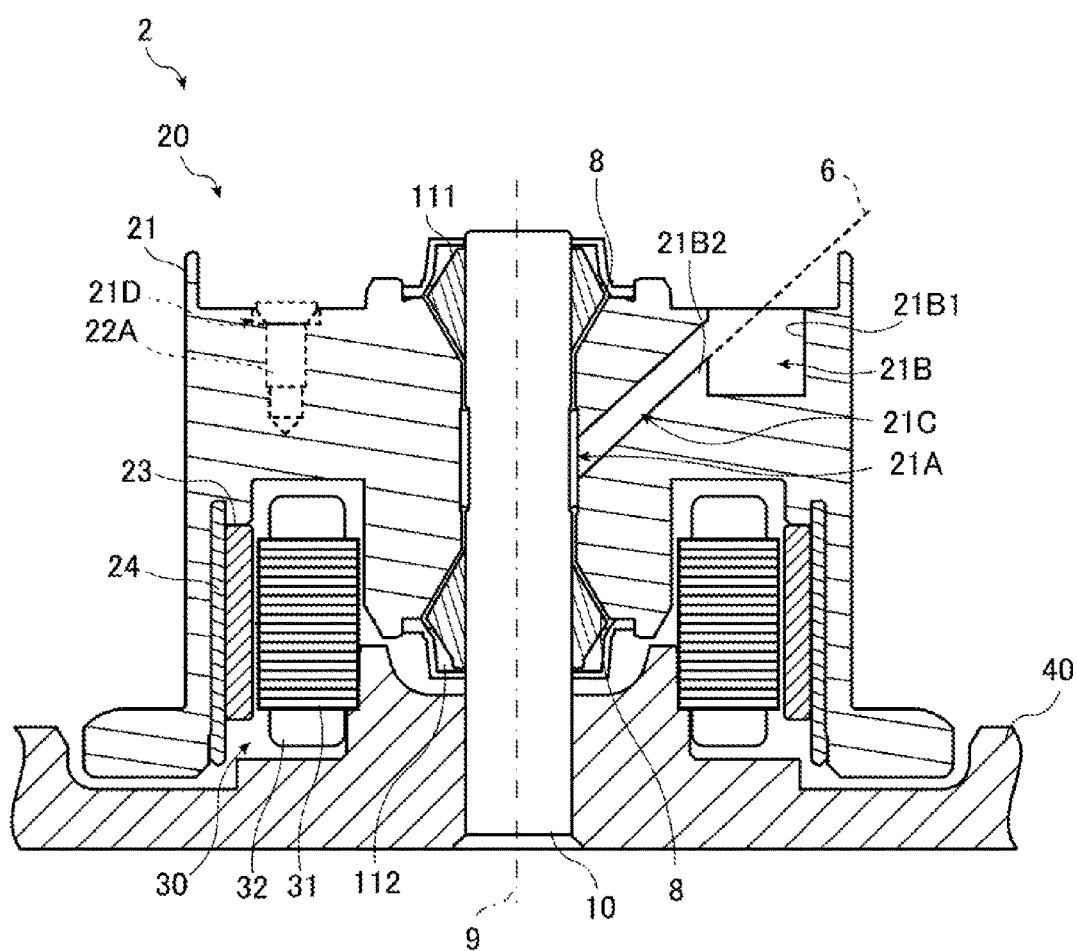
FIG. 6 is a sectional view of a spindle motor according to a second preferred embodiment of the present invention.

FIG. 6 is a sectional view of a spindle motor 2 according to the second preferred embodiment. In FIG. 6, the clamp member 22 illustrated in FIGS. 1 and 2 is not shown.

As in the first preferred embodiment, a first groove 21A extending along the circumferential direction is defined in at least one of an outer circumferential surface of a shaft 10 and an inner circumferential surface of a rotor hub 21.

In an upper surface of the rotor hub 21, a plurality of second grooves 21B are arranged along the circumferential direction. In addition, in the upper surface of the rotor hub 21, a plurality of screw grooves 21D are arranged along the circumferential direction. As in the first preferred embodiment, the second grooves 21B and the screw grooves 21D are arranged at different positions, without overlapping with one another, on the same circle centered on a central axis 9.

Each of the second grooves 21B is recessed in the axial direction, and includes a bottom surface parallel to a radial direction. Each second groove 21B may be in the shape of a column, or in the shape of a prism. A weight 7 (see FIG. 4) is inserted in at least one of the second grooves 21B in the case where there is a need to adjust rotation balance of the rotor hub 21.

A plurality of communicating holes 21C, each of which is arranged to bring the first groove 21A into communication with a corresponding one of the second grooves 21B, are defined in the rotor hub 21. Each of the communicating holes 21C is arranged to extend in an oblique direction, extending axially upward with increasing distance from the central axis 9, and is joined to a radially inner wall surface of the corresponding second groove 21B. In addition, an imaginary line 6 extending from an axially lower wall surface of each communicating hole 21C in the oblique direction, i.e., the direction in which the communicating hole 21C passes through the rotor hub 21, lies radially inward of a radially outermost wall portion 21B1 of the corresponding second groove 21B. With this arrangement, each communicating hole 21C can be easily worked, leading to an improvement in workability in manufacturing the spindle motor 2.

Figure 7:
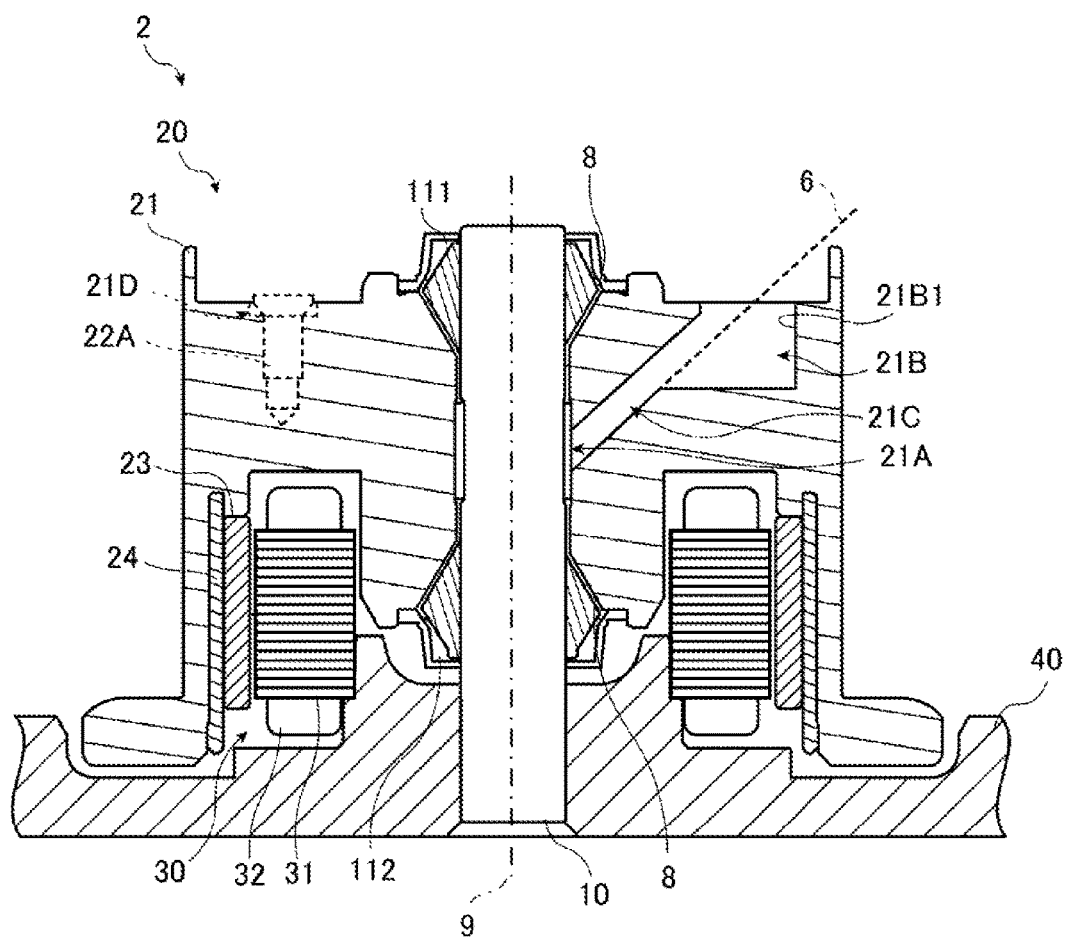
FIG. 7 is a sectional view of a spindle motor according to a modification of the second preferred embodiment.

FIG. 7 is a sectional view of a spindle motor 2 according to a modification of the second preferred embodiment. In this modification, an axially lower wall surface of a communicating hole 21C is joined to a bottom surface of a second groove 21B without a shoulder 21B2 (see FIG. 6) intervening therebetween.

Next, a disk drive apparatus according to a third preferred embodiment of the present invention will now be described below. The third preferred embodiment is different from each of the first and second preferred embodiments in the structure of the spindle motor, in particular, in the structure of the second groove(s). Differences therebetween will be described below. The structure of the disk drive apparatus according to the third preferred embodiment is similar to the structure of the disk drive apparatus 100 according to the first preferred embodiment except in the structure of the spindle motor, and accordingly, redundant description is omitted.

Figure 8:
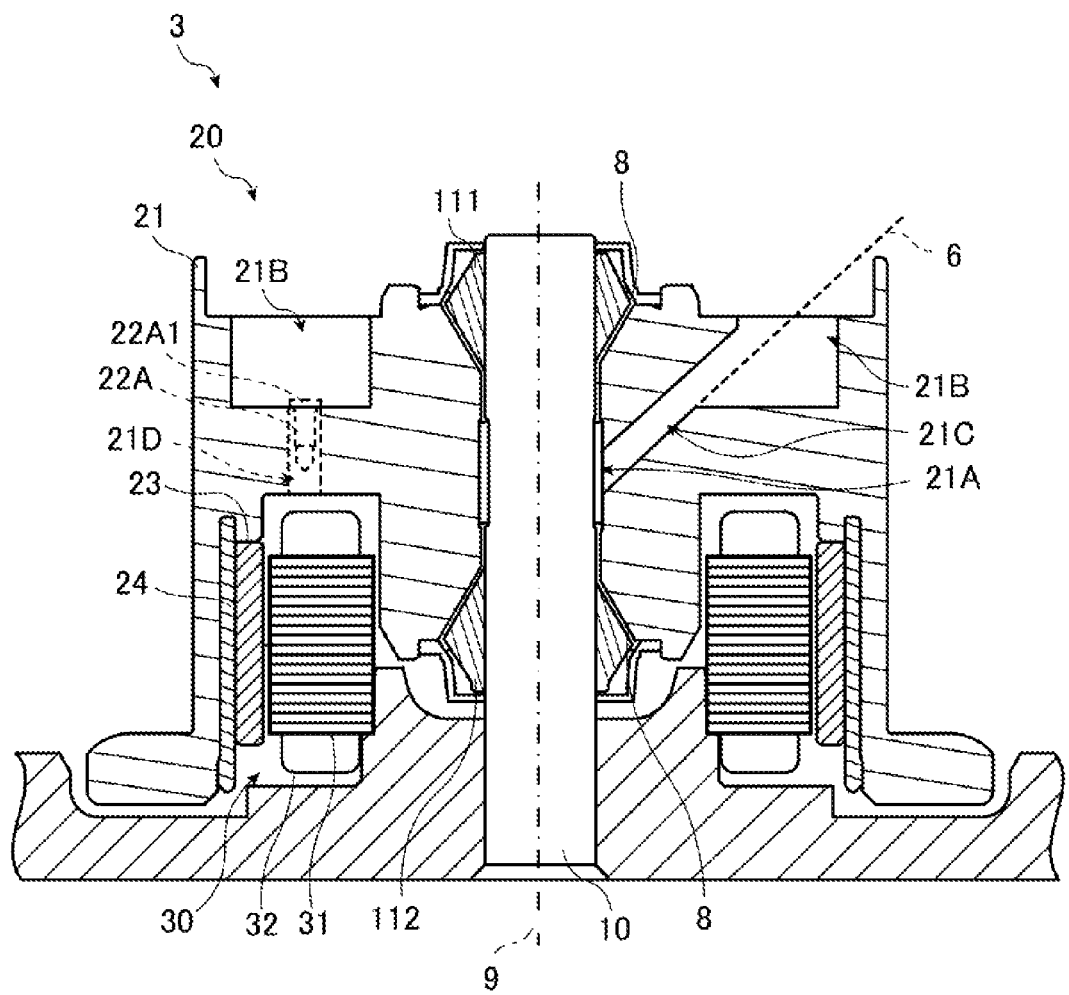
FIG. 8 is a sectional view of a spindle motor according to a third preferred embodiment of the present invention.
Figure 9:
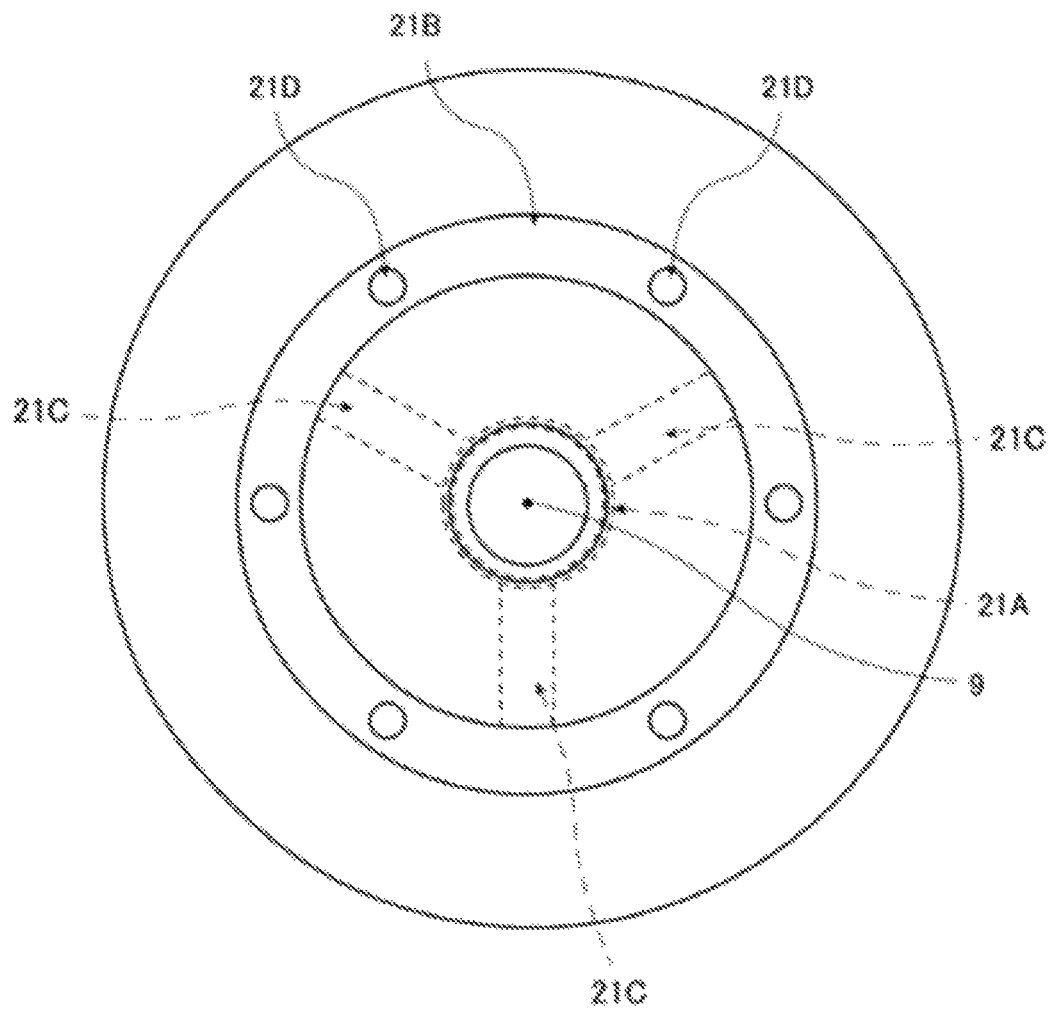
FIG. 9 is a plan view of a rotor hub according to the third preferred embodiment as viewed from the axially upper side.

FIG. 8 is a sectional view of a spindle motor 3 according to the third preferred embodiment. FIG. 9 is a plan view of a rotor hub 21 of the spindle motor 3 as viewed from the axially upper side. In FIG. 8, the clamp member 22 illustrated in FIGS. 1 and 2 is not shown.

A single second groove 21B is defined in an upper surface of the rotor hub 21. The second groove 21B can be regarded as a plurality of grooves continuous with each other and extending along the circumferential direction. The second groove 21B includes a bottom surface parallel to a radial direction. In the case where there is a need to adjust rotation balance of the rotor hub 21, a weight 7 is fixed to the bottom surface of the second groove 21B at at least one circumferential position through, for example, an adhesive member.

A plurality of screw grooves 21D are defined in the bottom surface of the second groove 21B. In this case, a large part of each of screws 22A used to fix the clamp member 22 is arranged axially below the bottom surface of the second groove 21B. Accordingly, a screw head 22A1 of each screw 22A does not protrude above the upper surface of the rotor hub 21. The screw grooves 21D according to this preferred embodiment are examples of a "first screw groove" of the present application. Note that each screw groove 21D may have any depth as long as the screw 22A can be inserted into the screw groove 21D.

A plurality of communicating holes 21C, each of which is arranged to bring a first groove 21A into communication with the second groove 21B, are defined in the rotor hub 21. Each of the communicating holes 21C is arranged to extend in an oblique direction, extending axially upward with increasing distance from a central axis 9, and is joined to a radially inner wall surface of the second groove 21B. The number of communicating holes 21C is more than one (three in FIG. 9), and the communicating holes 21C bring the first groove 21A into communication with the second groove 21B at a plurality of positions in the second groove 21B. When the single continuous second groove 21B is used, it is possible to fine-tune the arrangement of the weight(s) 7, i.e., a member(s) to adjust rotation balance of a rotating portion 20.

While the first, second, and third preferred embodiments of the present invention and several modifications thereof have been described above, it should be noted that features of the above-described preferred embodiments and the modifications thereof may be combined appropriately as long as no conflict arises.

Preferred embodiments of the present invention are applicable to fluid bearing apparatuses, motors, and disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fluid bearing apparatus comprising:
   a shaft arranged to extend along a central axis extending in a vertical direction, the shaft having an outer circumferential surface including a middle outer circumferential surface, an upper outer circumferential surface arranged axially above the middle outer circumferential surface, and a lower outer circumferential surface arranged axially below the middle outer circumferential surface;
   a rotating portion arranged opposite to an outer circumferential surface of the shaft, and arranged to be capable of rotating about the central axis with respect to the shaft;
   a lubricating oil arranged in a gap between the rotating portion and each of the upper and lower outer circumferential surfaces of the shaft;
   a first groove defined in at least one of the middle outer circumferential surface of the shaft and a portion of an inner circumferential surface of the rotating portion, the portion being opposite to the middle outer circumferential surface, the first groove being arranged to extend along a circumferential direction;
   a plurality of second grooves each of which is defined in an upper surface of the rotating portion; and
   a plurality of communicating holes each of which is defined in the rotating portion, and is in communication with the first groove and a corresponding one of the second grooves.

2. The fluid bearing apparatus according to claim 1, further comprising a weight inserted in at least one of the second grooves.

3. The fluid bearing apparatus according to claim 1, wherein
   each communicating hole is arranged to pass through the rotating portion in a straight line; and
   each second groove is recessed in a same direction as a direction in which the corresponding communicating hole passes through the rotating portion.

4. The fluid bearing apparatus according to claim 3, wherein, at a junction of each communicating hole with the corresponding second groove, the communicating hole is arranged to have an opening width smaller than an opening width of the corresponding second groove.

5. The fluid bearing apparatus according to claim 1, wherein
   each communicating hole is arranged to extend in an oblique direction, extending axially upward with increasing distance from the central axis; and
   an imaginary line extending in the oblique direction from an axially lower wall surface of the communicating hole lies radially inward of a radially outermost wall portion of the corresponding second groove.

6. The fluid bearing apparatus according to claim 1, wherein the second grooves are arranged to extend along the circumferential direction, and are continuous with each other.

7. The fluid bearing apparatus according to claim 1, wherein
   each second groove includes a bottom surface parallel to a radial direction; and
   the fluid bearing apparatus further comprises a first screw groove defined in the bottom surface.

8. The fluid bearing apparatus according to claim 1, further comprising a plurality of second screw grooves defined in the upper surface of the rotating portion, and arranged along the circumferential direction, wherein the second grooves are arranged along the circumferential direction on a radially inner side of the second screw grooves.

9. A motor comprising the fluid bearing apparatus of claim 1.

10. A disk drive apparatus comprising:
    the motor of claim 9;
    a housing arranged to house the motor;
    a disk supported by the motor in an interior space of the housing;
    an access portion arranged to perform at least one of reading and writing of information from or to the disk; and
    a head actuator mechanism arranged to support the access portion.

* * * * *